(12) United States Patent
Stephens

(10) Patent No.: US 8,050,947 B2
(45) Date of Patent: Nov. 1, 2011

(54) AUTOMATED INSURANCE ENROLLMENT, UNDERWRITING, AND CLAIMS ADJUSTING

(75) Inventor: Jack Stephens, Boise, ID (US)

(73) Assignee: Pets Best Insurance Services, LLC, Boise, ID (US)

( * ) Notice: Subject to any disclaimer, the term of this patent is extended or adjusted under 35 U.S.C. 154(b) by 1264 days.

(21) Appl. No.: 11/559,530

(22) Filed: Nov. 14, 2006

(65) Prior Publication Data

US 2007/0203758 A1 Aug. 30, 2007

Related U.S. Application Data

(60) Provisional application No. 60/736,981, filed on Nov. 15, 2005.

(51) Int. Cl.
*G06Q 40/00* (2006.01)
(52) U.S. Cl. .......................................................... 705/4
(58) Field of Classification Search .................... 705/4
See application file for complete search history.

(56) References Cited

U.S. PATENT DOCUMENTS

| | | | | |
|---|---|---|---|---|
| 4,975,840 A | * | 12/1990 | DeTore et al. ..................... | 705/4 |
| 5,897,619 A | * | 4/1999 | Hargrove et al. .................. | 705/4 |
| 6,186,793 B1 | * | 2/2001 | Brubaker ....................... | 434/107 |
| 6,604,080 B1 | * | 8/2003 | Kern ................................. | 705/4 |
| 7,698,155 B1 | * | 4/2010 | Prasad et al. ...................... | 705/3 |
| 2001/0049611 A1 | * | 12/2001 | Peach ................................ | 705/4 |
| 2002/0052761 A1 | * | 5/2002 | Fey et al. ........................... | 705/2 |
| 2002/0128879 A1 | * | 9/2002 | Spears .............................. | 705/4 |
| 2003/0083906 A1 | * | 5/2003 | Howell et al. .................... | 705/4 |
| 2005/0203781 A1 | * | 9/2005 | Wilson et al. .................... | 705/4 |
| 2007/0203758 A1 | * | 8/2007 | Stephens .......................... | 705/4 |

OTHER PUBLICATIONS

Veterinary Pet Insurance (http://web.archive.org/web/20010614065835/http://www.petinsurance.com/;http://web.archive.org/web/20010803104259/http://[h.petinsurance.com/about-vpi.cfm;http://web.archive.org/web/20010803104817/http://ph.petinsurance.com/forms/inhttp://web.archive.org/web/20011023205612/http://ph.petinsurance.com/forms/claimform.cfm).*
Office Action mailed Jul. 20, 2011 in U.S. Appl. No. 11/559,525, filed Nov. 14, 2006.

* cited by examiner

*Primary Examiner* — Jagdish Patel
*Assistant Examiner* — Kevin Poe
(74) *Attorney, Agent, or Firm* — John R. Thompson; Stoel Rives LLP

(57) ABSTRACT

An insurance enrollment and underwriting method includes comprising providing a first user interface with one or more controls for enabling a user to specify one or more health conditions in an enrollment application for pet health insurance. Data representing one or more health conditions specified through the first user interface is received and electronically processed, flagging each condition as a condition that is acceptable, precluded, or for manual review.

33 Claims, 8 Drawing Sheets

ENROLLMENT USER INTERFACE

Owner's Name:
Street:
City:
State:
Zip Code:
— 38

Pet's Name:
○ male
○ female
Species:
Breed:
age:
color:
— 40

Past/Current Health Conditions — 42

Ablation of Ear
Abrasion
Abscess
Acanthosis Nigricans
Ach Receptor Antibody Titer
Acne/Cellulitis
Acquired Achalasia
Activated Clotting Time (ACT)
Acute Renal Failure
Addison's Disease
Adrenal Profile

RESET    SUBMIT
— 44

AUTOMATED INSURANCE ENROLLMENT, UNDERWRITING, AND CLAIMS ADJUSTING

CROSS REFERENCE TO RELATED APPLICATIONS

This Application Claims the priority of provisional application 60/736,981 Filed Nov. 15, 2005.

BACKGROUND

Pet health insurance is gaining popularity and proving a useful tool for pet owners. Consumers of pet insurance, or any other type of insurance for that matter, benefit when insurance providers are able to implement efficient enrollment, underwriting, and claims procedures. Insurance providers benefit when those same procedures provide certainty as to the provider's potential exposure to claims.

The field of pet insurance has many inherent uncertainties that can prevent providers from providing efficient enrollment, underwriting, and claims services. For example, it would not be unexpected that a less than truthful consumer would seek pet insurance to cover expenses related to a pet's pre-existing condition. To address this situation, provider's of pet insurance may take steps to manually verify the pet's heath by contacting the pet's veterinarian before deciding to issue a policy and before paying any claim. This manual approach inflates insurance costs for the consumer. Eliminating this manual approach without a viable alternative exposes the insurance provider to unknown risks—also serving to inflate insurance costs.

DESCRIPTION OF THE DRAWINGS

FIG. 3 illustrates an exemplary screen view of a an enrollment interface according to an embodiment of the present invention.

DETAILED DESCRIPTION

INTRODUCTION: Embodiments of the present invention provide efficiencies in the enrollment, underwriting, and claims procedures for pet health insurance.

Figure 1:
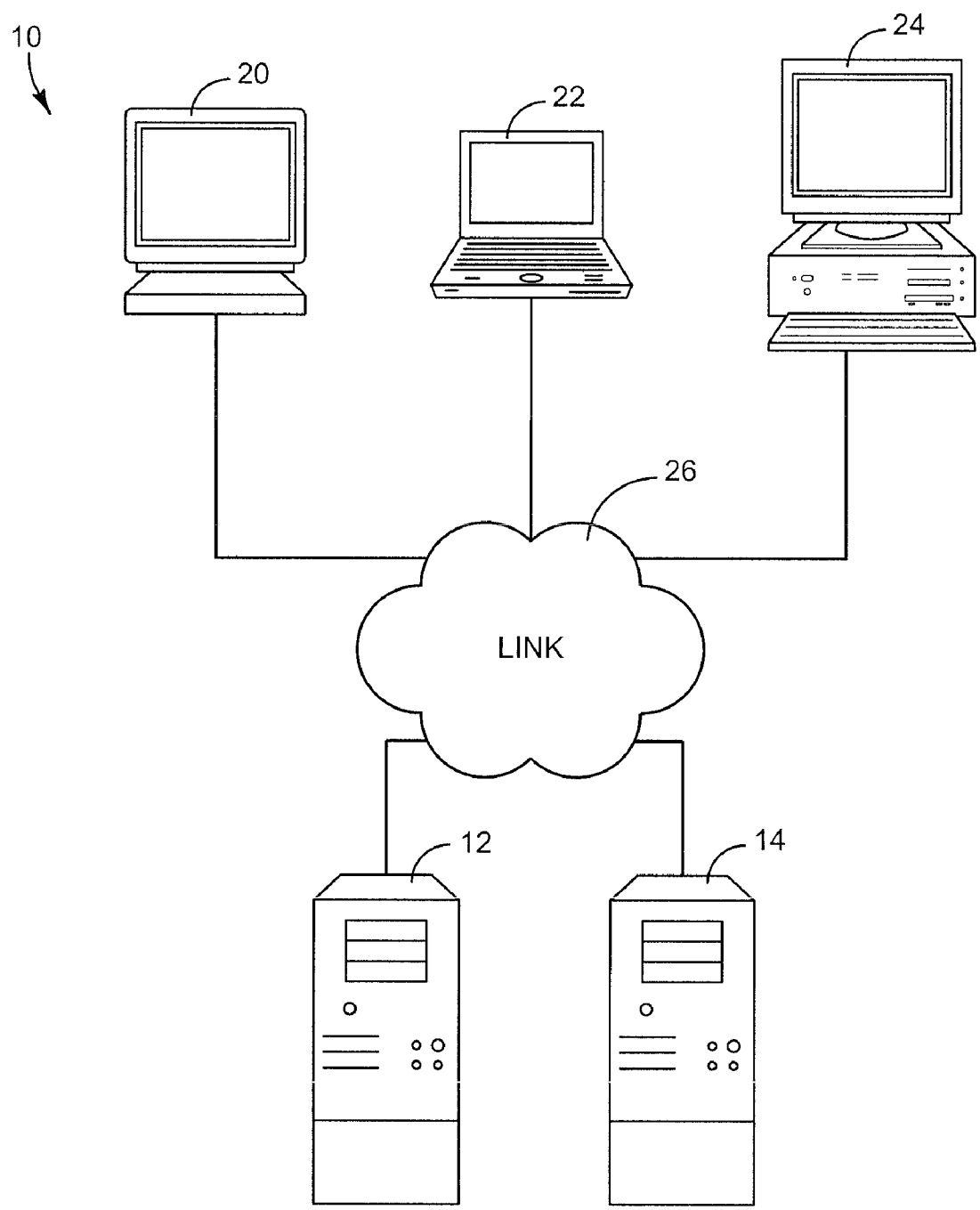
FIG. 1 is a schematic illustration of an exemplary computer network for use in implementing various embodiments of the present invention.

NETWORK ENVIRONMENT: FIG. 1 schematically illustrates exemplary network environment 10 for use in implementing various embodiments of the present invention. Network 10 includes server computers 12-18 and client computers 20-24. Server computers 12-18 represent generally any computing devices capable serving data and/or applications over network 10. Client computers 20-24 represent generally any computing devices capable of interacting with server computers 12-18 over network 10.

Link 24 represents generally a cable, wireless, or remote connection via a telecommunication link, an infrared link, a radio frequency link, or any other connector or system of connectors that provides electronic communication between client computers 20-24 and server computers 12-18. Link 24 may include an intranet, the Internet, or a combination of both. Each portion of link 24 connecting a given component one device to another may or may not be distinct from the remaining portions of link 24. For example databases two or more of server computers 12-18 may be directly connected to another server computer via one or more separate and distinct links.

Figure 2:
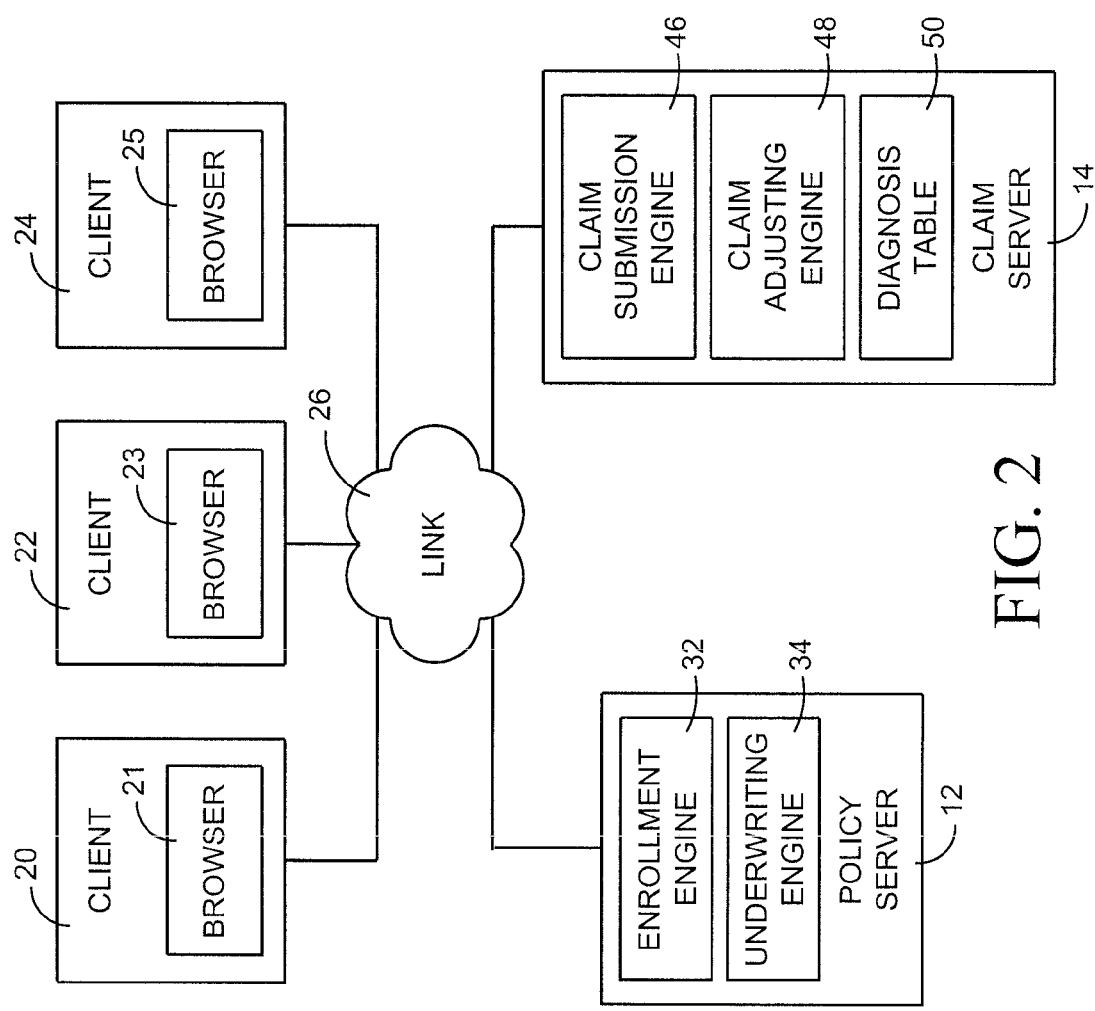
FIG. 2 is a block diagram illustrating various logical elements of the components of FIG. 1 according to an embodiment of the present invention.

COMPONENTS: FIG. 2 is an exemplary block diagram showing the logical components of server computers 12-18 and client computers 20-24. In this example, server computers 12-18 are labeled policy server 12, claim server 14, GIS server 16, and customer data server 18.

Each client computer 20, 22, and 24 is shown to include a browser 21, 23, and 25. Browsers 21, 23, and 25 represent generally any programming that, when executed by a respective client computer 20, 22, or 24, is capable of causing the display of one or more user interfaces through which a user can be informed and/or through which a user can supply information to one or more of server computers 12-18. Information provided to a user can include advertisements for pet health insurance, enrollment applications, claim submission forms, responses to enrollment applications and claim submissions as well as any other information related to pet health insurance.

As an example, client computer 20 may be accessed by a consumer—that is—a pet insurance policy holder or a person seeking to obtain a pet insurance policy. Client 22 may be accessed by an insurance underwriter or claims adjuster. Client computer 24 may accessed by a pet health provider or be given to a pet health provider to be accessed by the health provider's customers. While only three client computes are shown, network 10 may include any number of client computers. In one implementation, a client computer may be provided to each of any number of pet health care providers. Properly positioned in a provider's waiting room or examining room, the client computer can be used to advertise, to apply for a pet health insurance policy, and to submit a claim on an existing policy.

Customer data server 18 is shown to include policy records 28 and location database 30. Policy records 30 represents generally a collection of data records where each record contains data related to a particular insurance policy for pet health insurance. That data can include the name, address, and payment information of the policy holder, identifying information for the covered pet, and medical information for the pet. The medical information, for example, can identify pre-existing conditions identified during enrollment and any diagnoses and claims made during the policy's existence.

Location database 30 represents generally any collection of data identifying one or more physical locations. Data identifying a particular location might define a geographic point—a specific latitude and longitude for example. The data might instead define a particular area or a boundary of that area.

Policy server 12 is shown to include enrollment engine 32 and underwriting engine 34. Enrollment engine 32 represents generally any combination of hardware and/or programming capable of providing client devices 20-24 with an enrollment user interface enabling a user to specify one or more health conditions for a pet in when enrolling for a pet insurance policy for that pet. As used, the term "user" means any individual. A user, for example, may be an insurance consumer, a pet health care provider, or even an insurance provider employer such as an underwriter or claims adjuster. The term health condition means information related to a prior diagnosis, injury, and/or treatment. Enrollment engine 32 is also responsible for receiving data entered through the an enrollment interface and for returning user interfaces containing data indicative of approved enrollment, declined enrollment, and the need for a manual review.

FIG. 3 illustrates an exemplary screen view of an enrollment user interface 36 provided by enrollment engine 32 and displayed by one of client computing devices 20-24. Enrollment user interface 36 includes controls 38-44. Controls 38 enable a user to provide personal information identifying the pet owner's name and address. Controls 40 enable the user to provide information concerning their pet's name, sex, breed, age, and other characteristics. Control 42, shown as a scroll box, enables a user to select one or more conditions that identify a past or current injury, diagnosis and/or treatment for a pet to be insured. Controls 44 enable a user to cause a client computing device 20-24 to submit data representing information entered using controls 38-42 back to enrollment engine 32.

Returning to FIG. 2, underwriting engine 34 represents generally any combination of hardware and/or programming capable of obtaining data entered through enrollment interface 32 and received by enrollment engine 32—that data representing one or more conditions. Underwriting engine 34 is responsible for electronically processing that data and to electronically flag each condition as a condition that is acceptable, precluded, or for manual review. As an example, underwriting engine 34 may have access to a database (not shown) of condition in which each condition is associated with a flag or with data that can be used to identify an appropriate flag base on one or more variables such as a pet's breed, sex, and/or age. A condition for one breed may call for an acceptable flag where the same condition for another breed may call for a precluded flag or a manual review flag. Accessing that database, underwriting engine 34 can then automatically identify or determine an appropriate flag for each of a number of conditions.

Where one or more conditions are flagged for declined enrollment, underwriting engine 34 instructs enrollment engine 32 to return a user interface containing information indicating declined enrollment. Where no conditions are flagged for declined enrollment but one or more conditions are flagged for manual review, underwriting engine 34 instructs enrollment engine 32 to return a user interface containing information indicating the need for manual review. A manual review flag indicates that an enrollment application should not be accepted or declined in an automated fashion. An ultimate determination is to be made after a more detailed review of items such as a pet's medical history obtained from a veterinarian.

Where all conditions are flagged as acceptable, underwriting engine 34 instructs enrollment engine 32 to return a user interface containing information indicating approved enrollment. Such an interface need not reflect actual approval. Instead it may simply indicate an eligibility for pet health insurance coverage subject to receipt of a completed application and payment or payment information such as an authorization to charge a specified credit card or other account.

Where a policy is created, underwriting engine 34 is responsible for causing a record associated with that policy to be added to policy records 28. at record may, for example, contain data representing an effective date for the policy as well as one or more health conditions, if any, specified through an enrollment interface provided by enrollment engine 32.

Claim server 14 is shown to include claim submission engine 46, claim adjusting engine 48, and diagnosis table 50. Claim submission engine 46 represents generally any combination of hardware and/or programming capable of providing client devices 20-24 with a claim submission interface having controls enabling a user to submit a claim with respect to an active policy for pet health insurance. Those controls enabling a user to specify a diagnosis for which coverage is claimed. The diagnosis may be for a pet's treatment that is to be performed or that has already been performed. Claim submission engine 46 is also responsible for receiving data entered through the claim submission interface and for returning user interfaces containing data indicative of claim approval, claim limitation, or the need for manual review.

Figure 4:
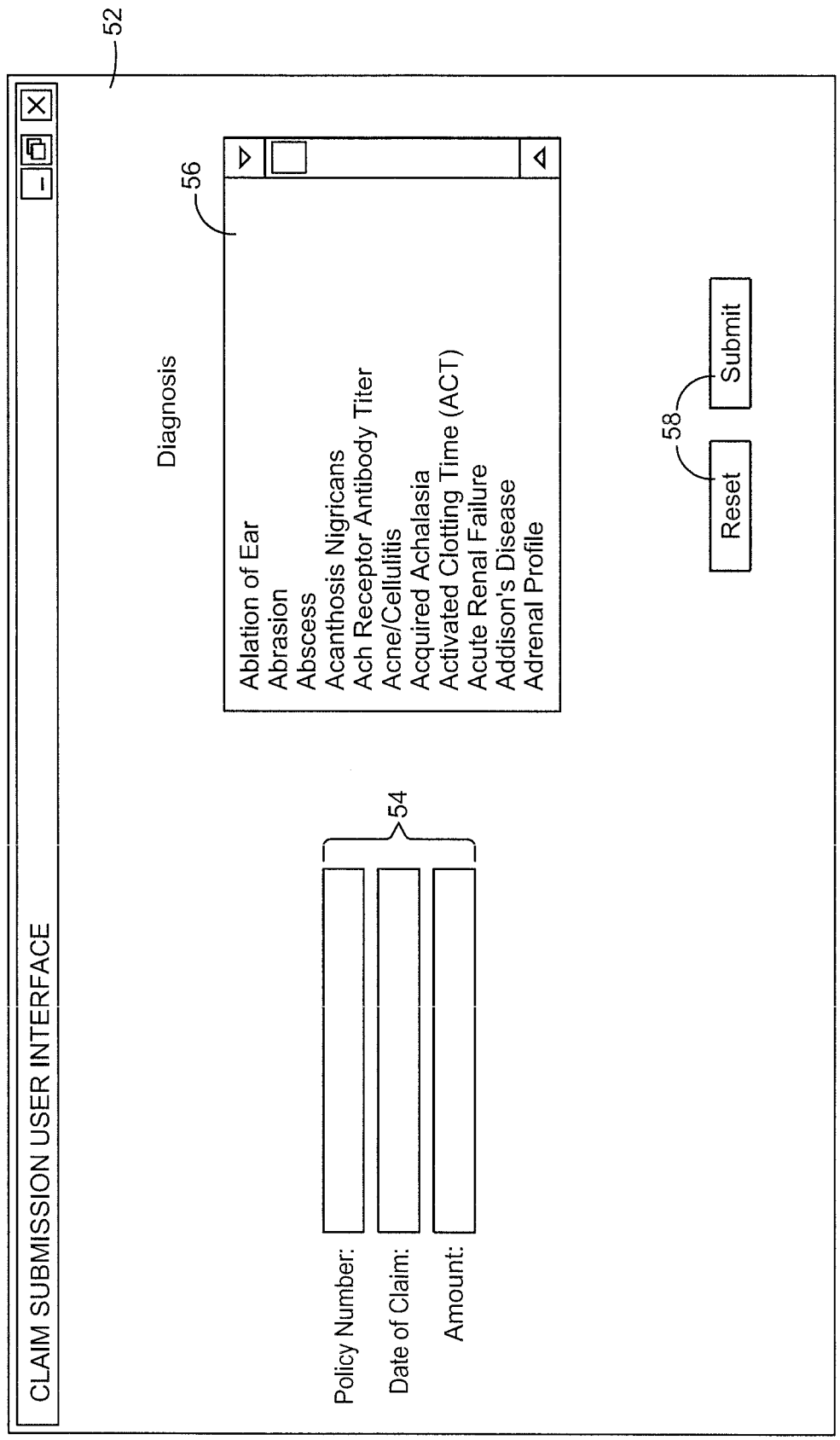
FIG. 4 illustrates an exemplary screen view of a claim submission interface according to an embodiment of the present invention.
Figure 5:
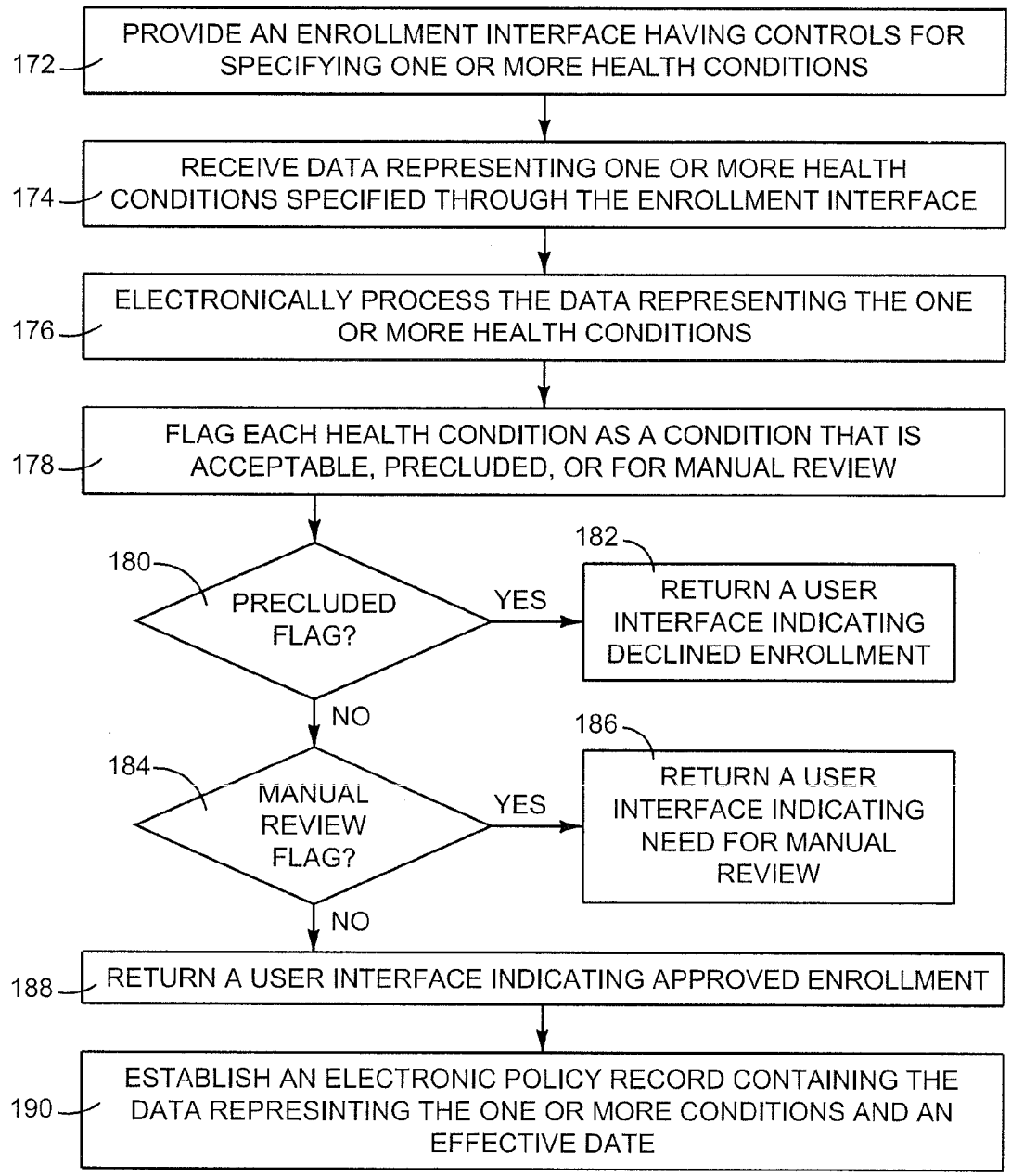
FIG. 5 is an exemplary flow diagram illustrating an enrollment and underwriting method according to an embodiment of the present invention.
Figure 6:
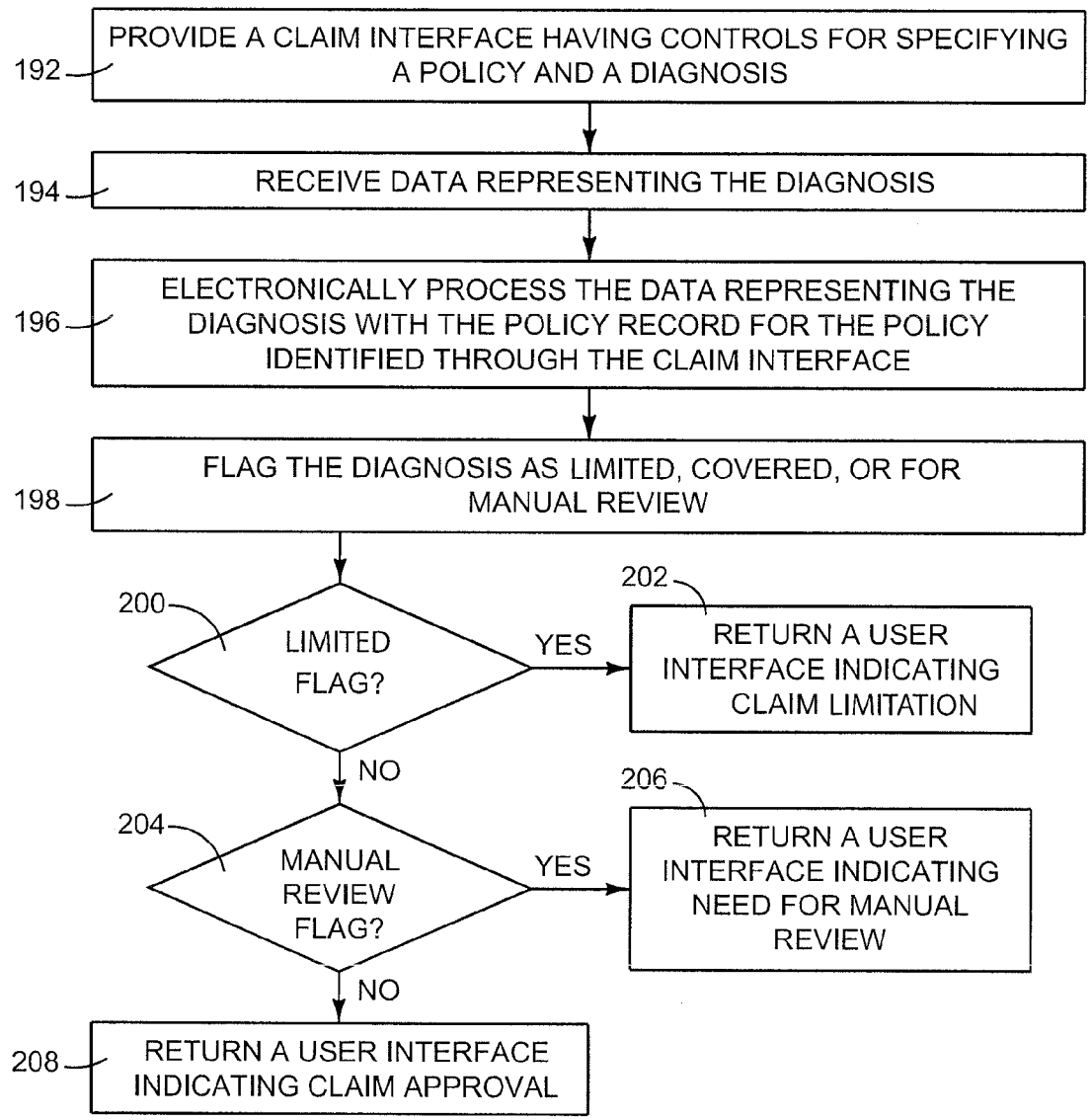
FIG. 6 is an exemplary flow diagram illustrating a claim submission and adjusting method according to an embodiment of the present invention.
Figure 7:
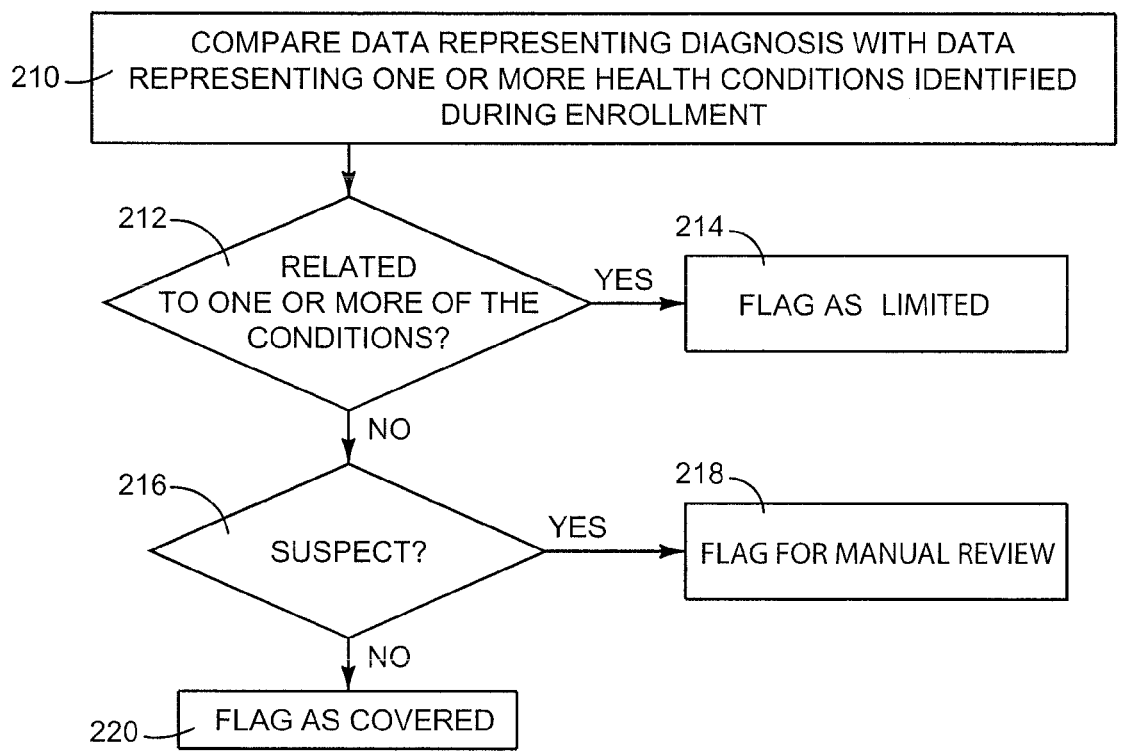
FIG. 7 is an exemplary flow diagram illustrating steps taken to flag a diagnosis according to an embodiment of the present invention.
Figure 8:
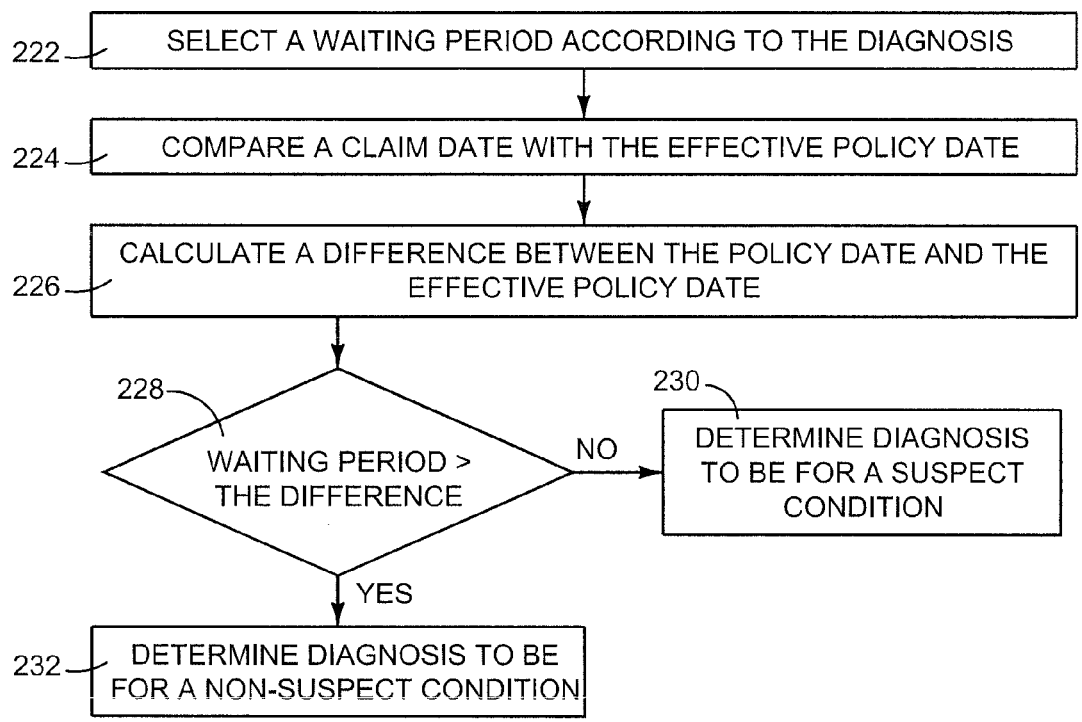
FIG. 8 is an exemplary flow diagram illustrating steps taken to determine whether a diagnosis is suspect according to an embodiment of the present invention.

FIG. 4 illustrates an exemplary screen view of a claim submission interface 52 provided by claim submission engine 46 and displayed by one of client computing devices 20-24. Claim submission interface 52 includes controls 54-58. Controls 54 enable a user to provide information identifying an active policy for pet health insurance, a date of a claim, and a dollar amount. Controls 56, shown as a scroll box, enables a user to select one or more conditions that identify a diagnosis for which coverage is being claimed under the identified policy. Controls 58 enable a user to cause a client computing device 20-24 to submit data representing information entered using controls 38-42 back to claim submission engine 46.

Returning to FIG. 2, claim adjusting engine 48 represents generally any combination of hardware and/or programming capable of obtaining the claim data entered through claim submission interface 52 and received by enrollment engine 32—that claim data representing a claim date and a diagnosis. Claim adjusting engine 48 is responsible for obtaining the record associated with the identified policy from customer data server 18 and electronically process the claim data with the associated record in order to electronically flag the diagnosis as limited, covered, or for manual review.

To reiterate, the claim data entered through the claim submission user interface includes data identifying a policy, a diagnosis, and a claim date. The record associated with the identified policy contains data identifying an effective date of the policy and one or more conditions submitted to policy server 12 via an enrollment user interface. Claims adjusting engine 48 flags a diagnosis as limited where a comparison of the identified diagnosis with the identified conditions from the policy record reveals that the diagnosis is related to one or more conditions identified by the policy record.

Where a diagnosis is not flagged as limited, claim adjusting engine 48 determines if the diagnosis is for a suspect condition. If the diagnosis is determined to be non-suspect, claim adjusting engine 48 flags the diagnosis as covered. If the diagnosis is determined to be suspect, claim adjusting engine 48 flags the diagnosis for manual review. A suspect diagnosis is one in which a duration between an effective date of the policy and a claim date does not exceed a predetermined duration. The predetermined duration may be dependent upon the diagnosis as well as one or more other factors such as pet breed, age and sex. A diagnosis for cancer may call for a longer predetermined duration than a diagnosis for a laceration. Claims adjusting engine 48 is responsible for comparing a predetermined duration for an identified diagnosis with a difference between an effective date of a policy and a claim date. Where the predetermined duration exceeds the difference, the identified diagnosis is suspect. Otherwise, it is not.

Where the identified diagnosis is flagged as limited, claim adjusting engine 48 instructs claim submission engine 46 to return a user interface containing information indicating claim limitation. The term "claim limitation" may indicate claim denial or, for example, it may indicate that there is a specified dollar limit of coverage with respect to the diagnosis rather than exclusion to coverage for a pre-existing condition. Where the identified diagnosis is flagged for manual review, claim adjusting engine 48 instructs claim submission engine 46 to return a user interface containing information indicating the need for manual review.

Where the identified diagnosis is flagged approved, claim adjusting engine 48 instructs claim submission engine 46 to return a user interface containing information indicating claim approval. Such an interface need not reflect actual claim approval. Instead it may simply indicate an eligibility for approval pending submission of a paid receipt or other proof of loss.

Diagnosis table 50 represents generally a collection of data used by claim adjusting engine 48 to determine whether or not a diagnosis is suspect. As an example, diagnosis table 50 may include a series of entries with each entry identifying a diagnosis and a predetermined duration for that diagnosis. In performing its task of determining if an identified diagnosis is suspect, claim adjusting engine 48 then can determine a predetermined duration for the identified diagnosis by examining an entry from diagnosis table 50 for the identified diagnosis.

ENROLLMENT AND UNDERWRITING METHODOLOGY: FIG. 15 is an exemplary flow diagram that helps illustrate steps taken during an enrollment and underwriting procedure. Initially, an enrollment interface is provided (step 172). The enrollment interface has one or more controls for specifying one or more health conditions. See enrollment interface 36 of FIG. 3 for an example. Data representing one or more health conditions specified through the enrollment interface is received (step 174). The data received in step 174 is processed (step 176) so that each health condition can be flagged as a condition that is acceptable, precluded, or for manual review (step 178).

An acceptable condition is one that will allow for an automated approval for enrollment. A precluded condition is one that calls for an automated denial of enrollment. A condition flagged for manual review is a condition that requires a manual review of an enrollment application and medical history to determine whether to approve or deny enrollment.

It is next determined if any condition has been flagged as precluded (step 180). If a precluded flag exists, a user interface indicating declined enrollment is returned (step 182). Otherwise, it is determined if any condition has been flagged for manual review (step 184). If a manual review flag exists, an interface indicating the need for manual review is returned (step 186).

Otherwise, an interface indicating approved enrollment is returned (step 188). An electronic policy record is created (step 190). The record contains the data representing the one or more conditions received in step 174 as well as an effective date for the policy (step 190).

CLAIM ADJUSTING METHODOLOGY: FIG. 16 is an exemplary flow diagram that helps illustrate steps taken during a claim adjusting procedure. Initially a claim submission interface is provided (step 192). The claim submission interface has one or more controls for specifying a policy and a diagnosis. See claim submission interface 52 of FIG. 4 for an example. Data, entered through the claim submission interface representing a policy and a diagnosis are received (step 194). The data representing the diagnosis is electronically processed with the policy record for the policy identified through the claim submission interface (step 196) so that the diagnosis can be flagged as limited, covered, or for manual review (step 198).

A diagnosis flagged as limited relates to a health condition that existed prior to the effective date of the policy. A covered diagnosis relates to a health condition that is not pre-existing and for which coverage can be approved in an automated fashion without manual review. A diagnosis flagged for manual review relates to a suspect condition that may be pre-existing and would benefit from a manual review of the claim and health records related to the diagnosis. Examples for implementing step 198 are provided below with references to the flow diagrams of FIGS. 17 and 18.

Continuing with FIG. 16, it is determined if the diagnosis is flagged as limited (step 200). If pre-existing, a user interface indicating claim limitation is returned (step 202). Otherwise, it is determined If the diagnosis is flagged for manual review (step 204). If flagged for manual review, a user interface indicating the need for manual review is returned (step 206). Otherwise, a user interface indicating claim approval is returned (step 208). It is noted that a diagnosis flagged as limited and a diagnosis flagged for approval may both be approved and coverage for both may be limited to a specified dollar limit of coverage.

FIGS. 17 and 18 are exemplary flow diagrams that helps illustrate steps taken to flag a diagnosis as limited, covered, or for manual review. Starting with FIG. 17, data representing the diagnosis is compared with data representing one or more conditions specified during enrollment and the effective date for the policy in question (step 210). It is determined if the data representing the diagnosis is related to one or more of those conditions (step 212). If related, the diagnosis is flagged as limited (step 214). Otherwise, it is determined if the diagnosis is for a suspect condition (step 216). If suspect, the diagnosis is flagged for manual review (step 218). Otherwise the diagnosis is flagged as covered (step 220). A suspect condition is a condition that may be pre-existing can benefit from a manual review.

FIG. 18 is an exemplary flow diagram that helps illustrate steps taken to determine if a diagnosis is for a suspect condition. Initially, a waiting period is selected according to the diagnosis (step 222). Using a database such as diagnosis table 50 of FIG. 2, different diagnoses can electronically associated with different waiting periods. For example, a diagnosis involving cancer may be associated with a longer waiting period than a diagnosis involving a laceration. A claim date is then compared with the effective policy date (step 224). A difference between the claim date and the policy date is calculated (step 226).

Next it is determined if the selected waiting period exceeds the duration calculated in step 226. If it does, the diagnosis is determined to be for a suspect condition (step 230). If it does not, the diagnosis is determined to be for a non-suspect condition (step 232).

CONCLUSION: While there are shown and described certain embodiments of the invention, it is to be distinctly understood that this invention is not limited thereto but may be variously embodied to practice within the scope of the following claims.

The diagrams of FIGS. 1 and 2 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The Exemplary screen views of FIGS. 3 and 4 are just that. The merely provide examples of user interfaces displaying controls for performing various tasks such as specifying health conditions in an enrollment application and specifying a diagnosis when claiming benefits.

Although the flow diagrams of FIGS. 5-8 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A computer-implemented method for insurance enrollment and underwriting, comprising:
    displaying on a display of a computer system a first user interface with one or more controls for enabling a user to specify a breed of a pet to be insured, and to specify one or more health conditions of the pet in an enrollment application for pet health insurance;
    receiving on the computer system data representing the breed and the one or more health conditions specified through the first user interface; and
    electronically processing on the computer system the data representing the one or more health conditions and electronically flagging each condition as a condition that is acceptable, precluded, or for manual review, wherein the flagging is based on the breed of the pet.

2. The computer-implemented method of claim 1, further comprising:
    displaying on the display a second user interface presenting information indicating declined enrollment if at least one of the conditions is flagged as precluded;
    displaying on the display a third user interface presenting information indicating approved enrollment, if all of the conditions are flagged as acceptable; and
    displaying on the display a fourth user interface presenting information indicating a need for a manual review if none of the conditions is flagged as precluded and at least one of the conditions is flagged as for manual review.

3. The computer-implemented method of claim 2, further comprising, after displaying the third user interface, creating for storage on a computer-readable storage medium an electronic record associated with an active policy for pet health insurance, the electronic record including the data representing the one or more health conditions specified through the first user interface and data representing an effective date for the policy.

4. The computer-implemented method of claim 3, further comprising:
    displaying on the display a fifth user interface having controls for enabling a user to submit a claim with respect to the active policy, the controls enabling the user to specify a diagnosis for which coverage is requested;
    receiving data representing the diagnosis;
    electronically processing the data representing the diagnosis with the electronic record associated with the active policy, including comparing the data representing the diagnosis with the data representing the one or more health conditions specified through the first user interface and comparing a date of the claim with the data representing the effective date of the active policy.

5. The computer-implemented method of claim 4, wherein electronically processing includes flagging the diagnosis as limited where the comparison of the data representing the diagnosis with the data representing the one or more health conditions reveals that the diagnosis is for a condition identified by the data representing the one or more health conditions; and
    otherwise determining if the diagnosis is for a suspect condition or a non-suspect condition and:
        flagging the diagnosis as covered if the diagnosis is for a non-suspect condition;
        flagging the diagnosis for manual review if the diagnosis is for a suspect condition.

6. The computer-implemented method of claim 5, wherein determining comprises:
    determining the diagnosis to be for a non-suspect condition if a difference between the date of the claim and the effective date of the active policy exceeds a predetermined duration;
    otherwise determining the diagnosis to be for a non-suspect condition.

7. The computer-implemented method of claim 6, further comprising selecting the predetermined duration according to the diagnosis.

8. The computer-implemented method of claim 5, further comprising:
    displaying on the display a sixth user interface presenting information indicating claim approval if the diagnosis is flagged approved;
    displaying on the display a seventh user interface presenting information indicating claim limitation, if the diagnosis is flagged as limited; and
    displaying on the display an eighth user interface presenting information indicating the need for a manual claim review if the diagnosis is flagged for manual review.

9. A computer-implemented method for insurance enrollment and underwriting, the method to be performed by one or more server computing devices electronically coupled to and accessible by one or more client computing devices that are operable to display user interfaces, to receive data from the one or more server computing devices, and to receive and transmit user input, the method comprising:

providing, from the server to a selected one of the client computing devices that facilitates enrollment, a first user interface with one or more controls for enabling a user to specify a breed of a pet to be insured and one or more health conditions of the pet in an enrollment application for pet health insurance;

receiving, at the server from the selected one of the client computing devices that facilitates enrollment, data representing the breed and the one or more health conditions specified by user input received at the selected one of the client computing devices through the first user interface; and electronically processing at the server the data representing the one or more health conditions and electronically flagging each as a condition that is acceptable, precluded, or manual review, based on the breed of the pet;

providing a second user interface to the selected one of the client computing devices that facilitates enrollment, if at least one of the conditions is flagged as precluded, the second user interface presenting information indicating declined enrollment;

providing a third user interface to the selected one of the client computing devices that facilitates enrollment, if all of the conditions are flagged as acceptable, the third user interface presenting information indicating approved enrollment; and providing a fourth user interface to the selected one of the client computing devices that facilitates enrollment, if none of the conditions is flagged as precluded and at least one of the conditions is flagged as for manual review, the fourth user interface presenting information indicating a need for a manual review.

10. The computer-implemented method of claim 9, further comprising, after providing the third user interface, establishing an electronic record on the server computing device, the electronic record associated with an active policy for pet health insurance and containing the data representing the one or more health conditions specified through the first user interface and data representing an effective date for the policy.

11. The computer-implemented method of claim 10, further comprising:

providing a fifth user interface to a selected one of the client computing devices that facilitates claim submission, the fifth user interface having controls for enabling a user to submit a claim with respect to the active policy, the controls enabling the user to specify a diagnosis for which coverage is requested;

receiving, from the selected one of the client computing devices that facilitates claim submission, data representing the diagnosis specified through user input received at the selected one of the client computing devices in response to the selected one of the client computing devices that facilitates claim submission displaying the fifth user interface;

electronically processing the data representing the diagnosis with the electronic record associated with the active policy, including comparing the data representing the diagnosis with the data representing the one or more health conditions specified through the first user interface and comparing a date of the claim with the data representing the effective date of the active policy;

flagging the diagnosis, wherein flagging comprises:
selecting a predetermined duration according to the diagnosis;
determining the diagnosis to be for a pre-existing condition where the comparison of the data representing the diagnosis with the data representing the one or more health conditions reveals that the diagnosis is for a condition identified by the data representing the one or more health conditions;
determining the diagnosis to be for a non-suspect condition if a difference between the date of the claim and the effective date of the active policy exceeds the predetermined duration;
determining the diagnosis to be for a suspect condition if a difference between the date of the claim and the effective date of the active policy does not exceed the predetermined duration;
flagging the diagnosis as limited if the diagnosis is determined to be for a pre-existing condition;
flagging the diagnosis as covered if the diagnosis is determined not to be for a pre-existing condition and is also determined to be non-suspect;
flagging the diagnosis for manual review if the diagnosis is determined not to be for a pre-existing condition and is also determined to be suspect;

providing a sixth user interface to the selected one of the client computing devices that facilitates claim submission if the diagnosis is flagged approved, the sixth user interface presenting information indicating claim approval;

providing a seventh user interface to the selected one of the client computing devices that facilitates claim submission if the diagnosis is flagged as limited, the seventh user interface presenting information indicating claim limitation; and providing an eighth user interface to the selected one of the client computing devices that facilitates claim submission if the diagnosis is flagged for manual review, the eighth user interface presenting information indicating the need for a manual claim review.

12. A computer-readable storage medium having computer executable instructions stored thereon, the instructions comprising:

providing a first user interface with one or more controls for enabling a user to specify a breed of a pet to be insured and one or more health conditions in an enrollment application for pet health insurance;

receiving data representing the breed and the one or more health conditions specified through the first user interface; and electronically processing the data representing the one or more health conditions and electronically flagging each as a condition that is acceptable, precluded, or for manual review, wherein the flagging is based on the breed of the pet.

13. The computer-readable storage medium of claim 12, having further instructions for:

providing a second user interface presenting information indicating declined enrollment if at least one of the conditions is flagged as precluded;

providing a third user interface presenting information indicating approved enrollment, if all of the conditions are flagged as acceptable; and providing a fourth user interface presenting information indicating a need for a manual review if none of the conditions is flagged as precluded and at least one of the conditions is flagged as for manual review.

14. The computer-readable storage medium of claim 13, having further instructions for, after providing the third user interface, establishing an electronic record associated with an active policy for pet health insurance, the electronic record containing the data representing the one or more health conditions specified through the first user interface and data representing an effective date for the policy.

15. The computer-readable storage medium of claim 14, having further instructions for:
   providing a fifth user interface having controls for enabling a user to submit a claim with respect to the active policy, the controls enabling the user to specify a diagnosis for which coverage is requested;
   receiving data representing the diagnosis;
   electronically processing the data representing the diagnosis with the electronic record associated with the active policy comparing the data representing the diagnosis with the data representing the one or more health conditions specified through the first user interface and comparing a date of the claim with the data representing the effective date of the active policy.

16. The computer-readable storage medium of claim 15, wherein the instructions for electronically processing include instructions for:
   flagging the diagnosis as limited where the comparison of the data representing the diagnosis with the data representing the one or more health conditions reveals that the diagnosis is for a condition identified by the data representing the one or more health conditions; and
   otherwise determining if the diagnosis is for a suspect condition or a non-suspect condition and:
      flagging the diagnosis as covered if the diagnosis is for a non-suspect condition;
      flagging the diagnosis for manual review if the diagnosis is for a suspect condition.

17. The computer-readable storage medium of claim 16, wherein the instructions for determining include instructions for:
   determining the diagnosis to be for a non-suspect condition if a difference between the date of the claim and the effective date of the active policy exceeds a predetermined duration;
   otherwise determining the diagnosis to be for a non-suspect condition.

18. The computer-readable storage medium of claim 17, having further instructions for selecting the predetermined duration according to the diagnosis.

19. The computer-readable storage medium of claim 16, having further instructions for:
   providing a sixth user interface presenting information indicating claim approval if the diagnosis is flagged approved;
   providing a seventh user interface presenting information indicating claim limitation, if the diagnosis is flagged limited; and
   providing an eighth user interface presenting information indicating the need for a manual claim review if the diagnosis is flagged for manual review.

20. An insurance enrollment and underwriting system comprising one or more computing devices, comprising:
   an enrollment engine operable to provide a first user interface having one or more controls for enabling a user to specify a breed of a pet to be insured and one or more health conditions of the pet in an enrollment application for pet health insurance; and
   an underwriting engine operable to receive and electronically process data representing the breed and the one or more health conditions specified through the first user interface and to electronically flag each condition as a condition that is one of acceptable, precluded, and manual review, wherein each condition is flagged based on the breed of the pet.

21. The system of claim 20, wherein the enrollment engine is operable to:
   provide a second user interface presenting information indicating declined enrollment if at least one of the conditions is flagged as precluded;
   provide a third user interface presenting information indicating approved enrollment, if all of the conditions are flagged as acceptable; and
   provide a fourth user interface presenting information indicating a need for a manual review if none of the conditions is flagged as precluded and at least one of the conditions is flagged manual review.

22. The system of claim 21, wherein, after providing the third user interface, the underwriting engine is operable to establish an electronic record associated with an active policy for pet health insurance, the electronic record containing the data representing the one or more health conditions specified through the first user interface and data representing an effective date for the policy.

23. The system of claim 22, further comprising:
   a claim submission engine operable to provide a fifth user interface having controls for enabling a user to submit a claim with respect to the active policy, the controls enabling the user to specify a diagnosis for which coverage is requested; and
   a claim adjusting engine operable to receive data representing the diagnosis and to electronically process the data representing the diagnosis with the electronic record associated with the active policy, wherein to electronically process the data includes comparing the data representing the diagnosis with the data representing the one or more health conditions specified through the first user interface and comparing a date of the claim with the data representing the effective date of the active policy.

24. The system of claim 23, wherein the claim adjusting engine is operable to:
   flag the diagnosis as limited where the comparison of the data representing the diagnosis with the data representing the one or more health conditions reveals that the diagnosis is for a condition identified by the data representing the one or more health conditions; and
   otherwise to determine if the diagnosis is for a suspect condition or a non-suspect condition and:
      flag the diagnosis as covered if the diagnosis is for a non-suspect condition, or
      flag the diagnosis for manual review if the diagnosis is for a suspect condition.

25. The system of claim 24, wherein the claim adjusting engine is operable to determine if the diagnosis is for a suspect condition or a non-suspect condition by:
   determining the diagnosis to be for a non-suspect condition if a difference between the date of the claim and the effective date of the active policy exceeds a predetermined duration;
   otherwise determining the diagnosis to be for a suspect condition.

26. The system of claim 25, wherein the claim adjusting engine is operable to select the predetermined duration according to the diagnosis.

27. The system of claim 24, wherein the claim submission engine is operable to:
   provide a sixth user interface presenting information indicating claim approval if the diagnosis is flagged approved;
   provide a seventh user interface presenting information indicating claim limitation, if the diagnosis is flagged limited; and provide an eighth user interface presenting information indicating the need for a manual claim review if the diagnosis is flagged for manual review.

28. An insurance enrollment and underwriting system, comprising:
client computing devices operable to display user interfaces and to receive and transmit user input;
an enrollment engine operable to provide a first selected one of the client computing devices with a first user interface with one or more controls for enabling a user to specify a breed of a pet to be insured and one or more health conditions in an enrollment application for pet health insurance;
an underwriting engine operable to:
receive data representing the breed and the one or more health conditions specified through user input received at the first selected one of the client computing devices in response to a display of the first user interface; and
electronically process the data representing the one or more health conditions and electronically flagging each as a condition that is acceptable, precluded, or manual review, the flagging based on the breed of the pet;
wherein the enrollment engine is further operable to:
provide a second user interface to the first selected one of the client computing devices if at least one of the conditions is flagged as precluded, the second user interface presenting information indicating declined enrollment;
provide a third user interface to the first selected one of the client computing devices if all of the conditions are flagged as acceptable, the third user interface presenting information indicating approved enrollment; and
provide a fourth user interface to the first selected one of the client computing devices if none of the conditions is flagged as precluded and at least one of the conditions is flagged as manual review, the fourth user interface presenting information indicating a need for a manual review.

29. The system of claim 28, wherein, after providing the third user interface, the underwriting engine is operable to establish an electronic record associated with an active policy for pet health insurance, the electronic record containing the data representing the one or more health conditions specified through the first user interface and data representing an effective date for the policy.

30. The system of claim 29, further comprising:
a claim submission engine operable to provide a fifth user interface to a second selected one of the client computing devices, the fifth user interface having controls for enabling a user to submit a claim with respect to the active policy, the controls enabling the user to specify a diagnosis for which coverage is requested;
a claim adjusting engine operable to:
receive data representing the diagnosis specified through user input received at the selected one of the client computing devices in response to a display of the fifth user interface;
electronically process the data representing the diagnosis with the electronic record associated with the active policy comparing the data representing the diagnosis with the data representing the one or more health conditions specified through the first user interface and comparing a date of the claim with the data representing the effective date of the active policy;
select a predetermined duration according to the diagnosis;
determine the diagnosis to be for a pre-existing condition where the comparison of the data representing the diagnosis with the data representing the one or more health conditions reveals that the diagnosis is for a condition identified by the data representing the one or more health conditions;
determine the diagnosis to be for a non-suspect condition if a difference between the date of the claim and the effective date of the active policy exceeds the predetermined duration;
determine the diagnosis to be for a suspect condition if a difference between the date of the claim and the effective date of the active policy does not exceed the predetermined duration;
flag the diagnosis as limited if the diagnosis is determined to be for a pre-existing condition;
flag the diagnosis as covered if the diagnosis is determined not to be for a pre-existing condition and is also determined to be non-suspect;
flag the diagnosis for manual review if the diagnosis is determined not to be for a pre-existing condition and is also determined to be suspect;
wherein the claim submission engine is further operable to:
provide a sixth user interface to the second selected one of the client computing devices if the diagnosis is flagged approved, the sixth user interface presenting information indicating claim approval;
provide a seventh user interface to the second selected one of the client computing devices if the diagnosis is flagged limited, the seventh user interface presenting information indicating claim limitation; and
provide an eighth user interface to the second selected one of the client computing devices if the diagnosis is flagged for manual review, the eighth user interface presenting information indicating the need for a manual claim review.

31. A computer-implemented method for insurance enrollment and underwriting, comprising:
displaying on a display of a computer system a first user interface with one or more controls for enabling a user to specify a species of a pet to be insured, and to specify one or more health conditions of the pet in an enrollment application for pet health insurance;
receiving on the computer system data representing the species and the one or more health conditions specified through the first user interface; and
electronically processing on the computer system the data representing the one or more health conditions and electronically flagging each condition as a condition that is acceptable, precluded, or for manual review, wherein the flagging is based on the species of the pet.

32. The computer-implemented method of claim 31, further comprising:
displaying on the display a second user interface presenting information indicating declined enrollment if at least one of the conditions is flagged as precluded;
displaying on the display a third user interface presenting information indicating approved enrollment, if all of the conditions are flagged as acceptable; and
displaying on the display a fourth user interface presenting information indicating a need for a manual review if none of the conditions is flagged as precluded and at least one of the conditions is flagged as for manual review.

33. The computer-implemented method of claim 32, further comprising, after displaying the third user interface, creating for storage on a computer-readable storage medium an electronic record associated with an active policy for pet health insurance, the electronic record including the data representing the one or more health conditions specified through the first user interface and data representing an effective date for the policy.

* * * * *